United States Patent
Jakubek

(10) Patent No.: US 12,135,092 B2
(45) Date of Patent: Nov. 5, 2024

(54) FUEL-ISOLATION SYSTEM HAVING RUPTURE DIAPHRAGM

(71) Applicant: AEROJET ROCKETDYNE, INC., Sacramento, CA (US)

(72) Inventor: Matthew Jakubek, Seattle, WA (US)

(73) Assignee: AEROJET ROCKETDYNE, INC., Sacramento, CA (US)

( * ) Notice: Subject to any disclaimer, the term of this patent is extended or adjusted under 35 U.S.C. 154(b) by 0 days.

(21) Appl. No.: 18/027,205

(22) PCT Filed: Oct. 28, 2020

(86) PCT No.: PCT/US2020/057602
§ 371 (c)(1),
(2) Date: Mar. 20, 2023

(87) PCT Pub. No.: WO2022/093203
PCT Pub. Date: May 5, 2022

(65) Prior Publication Data
US 2023/0332706 A1   Oct. 19, 2023

(51) Int. Cl.
| F16K 17/16 | (2006.01) |
| F16K 31/00 | (2006.01) |
| H01M 50/333 | (2021.01) |
| H01M 50/375 | (2021.01) |

(52) U.S. Cl.
CPC ........ *F16K 17/1626* (2013.01); *F16K 31/002* (2013.01); *F16K 17/1613* (2013.01); *H01M 50/333* (2021.01); *H01M 50/375* (2021.01)

(58) Field of Classification Search
CPC ............. F16K 17/1626; F16K 17/1613; F16K 31/002; H01M 50/375; H01M 50/333
USPC ..... 137/68.3, 68.11, 68.12, 68.19, 68.27, 72, 137/76, 68.25
See application file for complete search history.

(56) References Cited

U.S. PATENT DOCUMENTS

| 1,671,368 A | * | 5/1928 | Johann | ............ F16K 17/40 |
| | | | | 222/5 |
| 1,921,411 A | * | 8/1933 | Johann | ............ A62C 99/0027 |
| | | | | 137/75 |
| 3,399,802 A | * | 9/1968 | Wedner | ............ F16K 13/04 |
| | | | | 137/68.25 |

(Continued)

FOREIGN PATENT DOCUMENTS

WO    2004079204    9/2004

OTHER PUBLICATIONS

International Preliminary Report on Patent Ability for International Application No. PCT/US2020/057602 mailed May 11, 2023.

(Continued)

*Primary Examiner* — Minh Q Le
(74) *Attorney, Agent, or Firm* — Carlson, Gaskey & Olds, P.C.

(57) ABSTRACT

A fuel-isolation system includes a valve body that defines a flow passage that extends from an inlet to an outlet, a rupture diaphragm in the flow passage and fluidly sealing the inlet from the outlet, and an actuator situated adjacent the rupture diaphragm. The rupture diaphragm is integral with the valve body. The actuator includes a plunger that is configured to move and cause breach of the rupture diaphragm and thereby fluidly connect the inlet and the inlet.

18 Claims, 3 Drawing Sheets

(56) References Cited

U.S. PATENT DOCUMENTS

| | | | | |
|---|---|---|---|---|
| 3,827,449 A * | 8/1974 | Gurizzan | F16K 13/04 | 222/397 |
| 3,921,556 A * | 11/1975 | Wood | B21D 26/02 | 29/890.141 |
| 4,006,780 A * | 2/1977 | Zehr | A62C 35/00 | 137/72 |
| 4,046,156 A * | 9/1977 | Cook | F16K 17/162 | 137/68.13 |
| 4,080,965 A * | 3/1978 | Phillips | A61M 39/14 | 604/905 |
| 4,083,187 A * | 4/1978 | Nagashima | F16K 17/403 | 60/407 |
| 4,580,589 A * | 4/1986 | Le Bras | F16K 17/1626 | 137/68.25 |
| 4,580,691 A * | 4/1986 | Hansen | F16K 17/1613 | 137/910 |
| 4,830,052 A * | 5/1989 | Oberlin | F16K 17/1626 | 137/68.24 |
| 5,065,783 A * | 11/1991 | Ogle, II | A61M 39/045 | 604/905 |
| 5,076,312 A * | 12/1991 | Powell | B60R 21/268 | 137/68.25 |
| 5,421,609 A * | 6/1995 | Moore | B60R 21/272 | 280/737 |
| 5,495,865 A * | 3/1996 | Wass | F16K 17/383 | 251/38 |
| 5,647,390 A * | 7/1997 | Wass | F16K 17/383 | 137/68.12 |
| 5,664,804 A * | 9/1997 | Saccone | F16K 13/04 | 137/68.13 |
| 5,738,276 A | 4/1998 | Saur | | |
| 5,820,162 A * | 10/1998 | Fink | B60R 21/26 | 137/71 |
| 6,260,571 B1 * | 7/2001 | Lind | F16K 1/302 | 137/580 |
| 6,748,743 B1 | 6/2004 | Foster-Pegg | | |
| 6,941,938 B2 * | 9/2005 | D'Arcy | F41B 11/62 | 222/5 |
| 7,401,808 B2 * | 7/2008 | Rossbach | B60R 21/268 | 280/741 |
| 7,703,471 B2 * | 4/2010 | Edwards | F16K 31/0651 | 220/89.3 |
| 7,878,215 B2 | 2/2011 | McLelland et al. | | |
| 8,448,716 B2 * | 5/2013 | Yoshida | A62C 13/62 | 169/72 |
| 2006/0137742 A1 * | 6/2006 | Smith | F16K 17/38 | 137/68.13 |
| 2010/0122735 A1 | 5/2010 | Schramm et al. | | |
| 2010/0206390 A1 * | 8/2010 | Hollars | F16K 17/403 | 222/5 |

OTHER PUBLICATIONS

International Search Report and Written Opinion for International Application No. PCT/US2020/057602 mailed Jul. 30, 2021.

* cited by examiner

FUEL-ISOLATION SYSTEM HAVING RUPTURE DIAPHRAGM

BACKGROUND

Vehicles burn fuel for propulsion and/or orientation adjustment. In some types of vehicles, up until "activation" the fuel may be contained within an isolation section of a fuel system of the vehicle. The isolation section is robust in order to assure leak-free containment. Upon activation, the fuel is released from the isolation section such that the vehicle becomes operable for propulsion and/or orientation adjustment.

SUMMARY

A fuel-isolation system according to an example of the present disclosure includes a valve body that defines a flow passage extending from an inlet to an outlet and a rupture diaphragm integral to the valve body. The rupture diaphragm is in the flow passage and fluidly seals the inlet from the outlet. An actuator is situated adjacent the rupture diaphragm. The actuator includes a plunger that is configured to move and cause breach of the rupture diaphragm and thereby fluidly connect the inlet and the outlet. A propellant tank has an outlet attached to or integral to the inlet of the valve body.

In a further embodiment of any of the foregoing embodiments, the actuator is a thermal actuator.

In a further embodiment of any of the foregoing embodiments, the actuator is a wax actuator.

In a further embodiment of any of the foregoing embodiments, the plunger is a piston.

In a further embodiment of any of the foregoing embodiments, the plunger is configured to pierce the rupture diaphragm.

In a further embodiment of any of the foregoing embodiments, the rupture diaphragm has at least one score line.

In a further embodiment of any of the foregoing embodiments, the rupture diaphragm is curved.

A further embodiment of any of the foregoing embodiments includes a knife edge adjacent the rupture diaphragm and located on an opposite side of the diaphragm from the actuator.

In a further embodiment of any of the foregoing embodiments, the rupture diaphragm is welded to the valve body.

In a further embodiment of any of the foregoing embodiments, the rupture diaphragm is metallic.

In a further embodiment of any of the foregoing embodiments, in addition to the inlet and the outlet, the valve body defines a test port that opens into the flow passage and is fluidly connected with the outlet but not the inlet.

In a further embodiment of any of the foregoing embodiments, the outlet contains a filter.

In a further embodiment of any of the foregoing embodiments, the outlet contains a venturi.

A further embodiment of any of the foregoing embodiments includes a fuel tank connected with the inlet.

In a further embodiment of any of the foregoing embodiments, the propellant tank contains pressurized hydrazine.

In a further embodiment, the fuel isolation system is in any of the foregoing embodiments is in a vehicle.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Mechanisms that control the release of fuel from isolation sections of fuel systems in vehicles can be relatively complex. Such mechanisms must be reliably controlled and operational to activate the release of the fuel only at the desired time. As can be appreciated, in order to meet these requirements, such mechanisms may have relatively complicated designs. Although these solutions are effective, they may add expense, not only from the design itself, but also from installation steps and quality assurance measures. Along these lines, as will be apparent from the present disclosure, the unique fuel-isolation system herein seeks to provide a reliable, lost cost option to control activation of the release of fuel.

Figure 1:
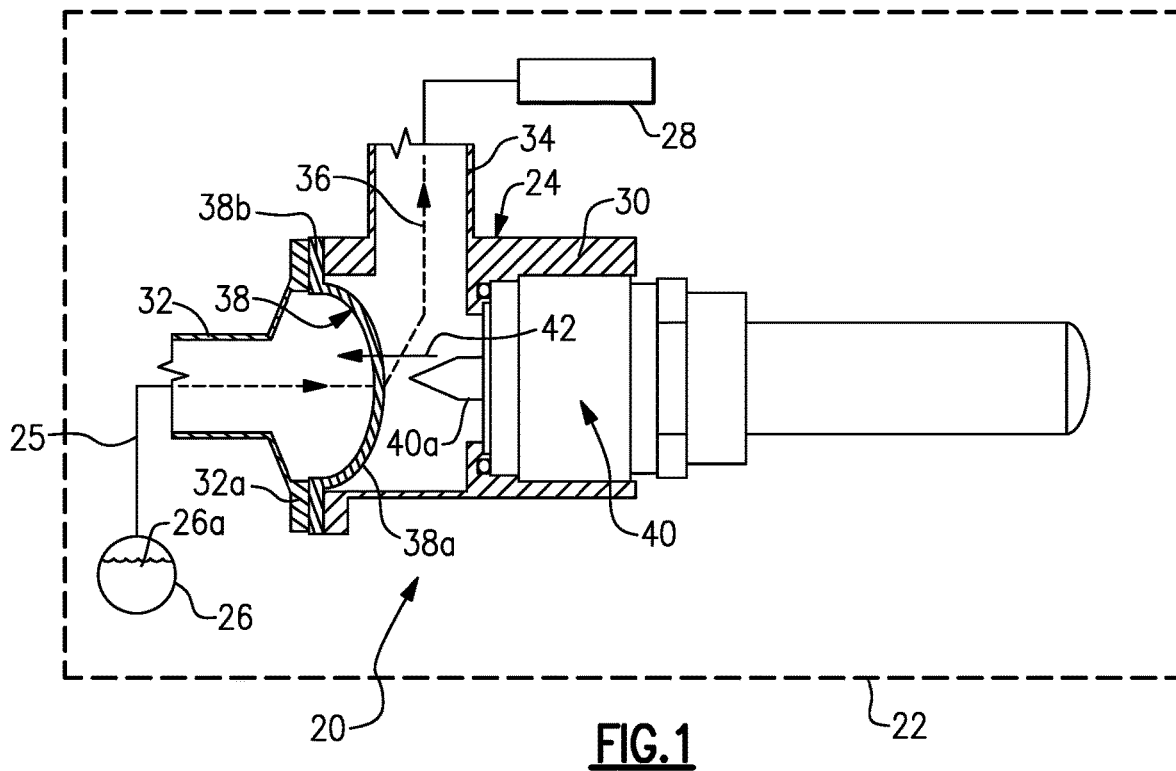
FIG. 1 illustrates an example fuel system that is in a space vehicle.

FIG. 1 schematically illustrates an example fuel system 20 ("system 20"). As shown, the system 20 is in a vehicle, which is generally designated at 22. For example, the vehicle 22 is a satellite, although this disclosure may be applied to other types of vehicles.

The system 20 includes an isolation valve 24 that is fluidly connected with an outlet 25 of a fuel tank 26 that may contain fuel 26a, such as hydrazine. For example, the outlet 25 is attached to or integral to the isolation valve 24. The isolation valve 24 serves to isolate the fuel 26a from a remainder of the fuel system 20, which is generally designated at 28. As will be understood, the remainder of the fuel system 28 may include fluid lines, valves, injectors, and other engine or thruster components that are well understood in the field.

The isolation valve 24 is formed of a valve body 30. The valve body 30 is formed of a metallic alloy and may be of single- or multi-piece construction as long as it is leak-free under the pressure and use conditions. The valve body 30 includes an inlet 32, an outlet 34, and a flow passage 36 that extends from the inlet 32 to the outlet 34. The inlet 32 is welded to the outlet 25 of the fuel tank 26. In this example, the isolation valve has an "elbow" configuration such that the flow passage 36 turns approximately 90 degrees. It is to be appreciated, however, that the geometry of the isolation valve 24 and flow passage 36 path may be varied.

The isolation valve 24 further includes a rupture diaphragm 38 located in the flow passage 36 and an actuator 40 situated adjacent the rupture diaphragm 38. The rupture diaphragm 38 fluidly seals the inlet 32 from the outlet 34. The actuator 40 includes a plunger 40a that is configured to move in an extended manner (as represented at arrow 42). The actuator 40 is situated such that the plunger 40a is extendable over a stroke that intersects with the rupture diaphragm 38. For example, the stroke of about one-half inch and exerts about 100 pounds of force. The rupture diaphragm 38 is frangible under the impact of the plunger 40a such that extension of the plunger 40a causes breach of the rupture diaphragm 38.

In one example, the actuator 40 is a thermal actuator. One example thermal actuator is a wax actuator, such as a paraffin actuator. A thermal actuator converts thermal energy into mechanical energy in the form of extension of the plunger 40a. In one example based on paraffin, the actuator 40 includes a heater that is operable to heat paraffin wax, such as to a temperature above the melting temperature of the paraffin wax (about 176° F.). The wax melts and expands, and the expansion causes extension of the plunger 40a. As will be appreciated, other types of actuators may be used, however, the wax actuator has relatively simple binary on/off operation to activate the heater and is low in cost.

Figure 2:
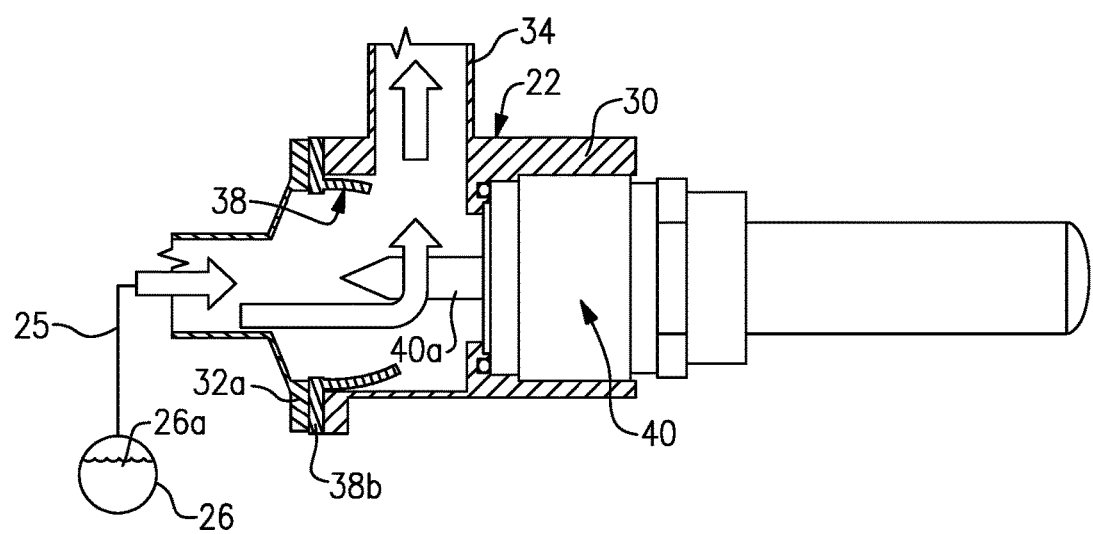
FIG. 2 illustrates an isolation valve of the fuel system, with the isolation valve in an actuated state to breach a rupture diaphragm.

Prior to rupture (FIG. 1), the rupture diaphragm 38 seals the inlet 32 from the outlet 34 such that the fuel 26a remains isolated in the system 20. The actuator 40 is actuated to extend the plunger 40a when the system 20 is to be activated to release fuel such that the space vehicle 22 becomes operable for propulsion and/or orientation adjustment. Upon actuation, the plunger 40a extends and breaches the rupture diaphragm 38, as shown in FIG. 2. Once ruptured, the inlet 32 and the outlet 34 become fluidly connected, thereby permitting fuel to flow through the isolation valve 24 to the remainder 28 of the system 20 for propulsion and/or orientation adjustment. In one further example, the isolation valve 24 can be reused by removing the breached rupture diaphragm 38 and replacing it with a new, non-breached rupture diaphragm 38.

Figure 3:
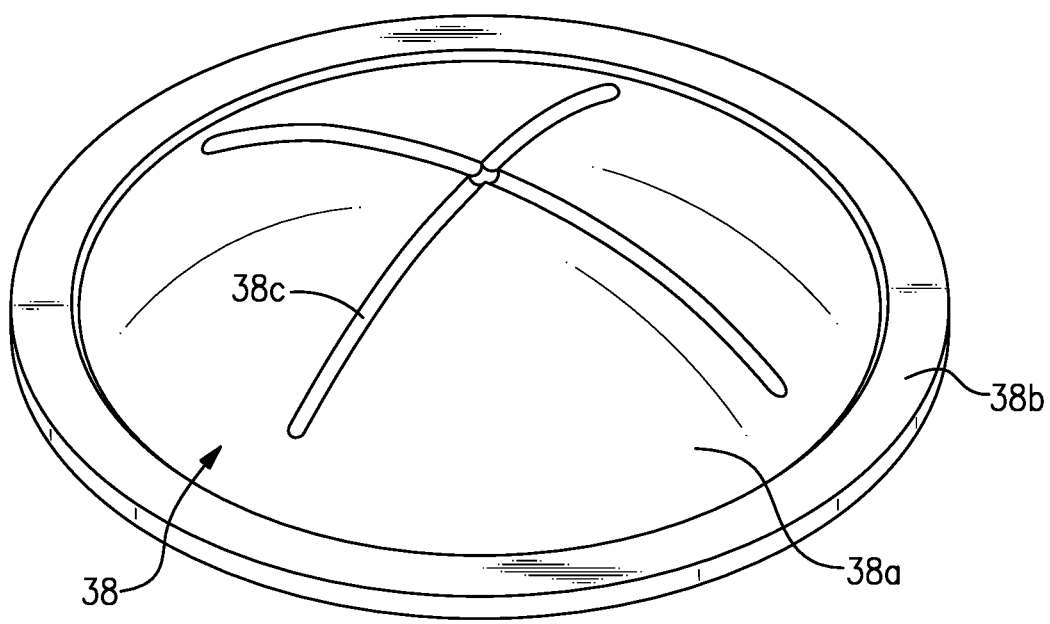
FIG. 3 illustrates an isolated view of an example rupture diaphragm.

FIG. 3 illustrates an isolated view of an example of the rupture diaphragm 38. The rupture diaphragm 38 includes a diaphragm section 38a and a rim 38b. The diaphragm section 38a in this example is metallic and may be formed of titanium or aluminum alloy. In this regard, the rupture diaphragm 38 is generally rigid, although it could alternatively be flexible as long as it can maintain isolation of the fuel 26a.

In this example, the diaphragm section 38a is partially spherical and convex (toward the plunger 40a). Such a geometry permits the diaphragm section 38a to be relatively close to the plunger 40a, thereby reducing the required stroke length for breach. If the design envelope and stroke length allow, the diaphragm section 38a may alternatively have a conical, pyramidal, or other geometry and may be concave or even planar.

In the illustrated example, the surface of the diaphragm section 38a has at least one score line 38c. The score line 38c is a groove in the surface that serves to weaken the diaphragm section 38a in order to facilitate breaching by the plunger 40a. The rim 38b permits the diaphragm 38 to be secured in a leak-free manner in the valve body 30 of the isolation valve 24. For instance, as shown in FIG. 1, the diaphragm 38 is integrated into the valve body 30 (i.e., is integral with) via the rim 38b being welded to a flange 32a of the inlet 32. Additionally or alternatively, a portion of or all of the diaphragm 38 is machined into the valve body 30.

Figure 4:
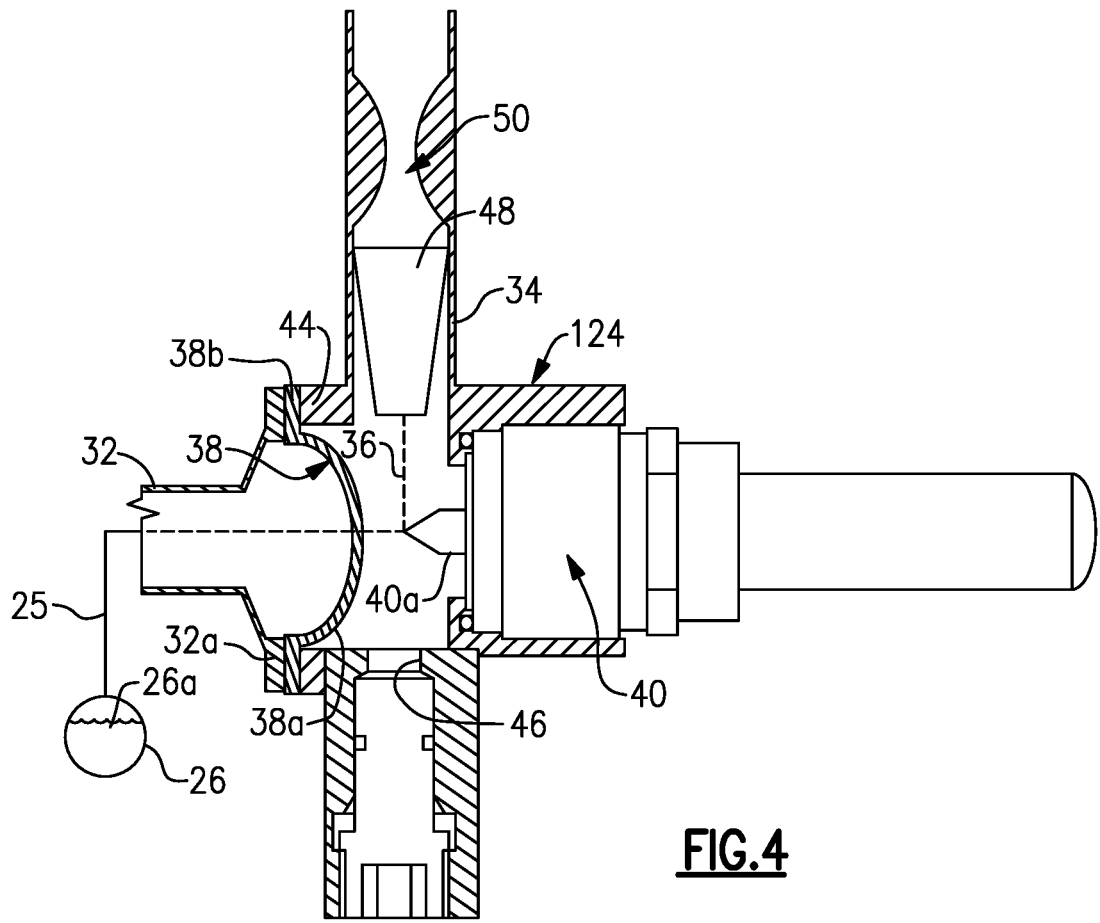
FIG. 4 illustrates another example isolation valve that is configured with a test port.

FIG. 4 illustrates another example isolation valve 124. In this disclosure, like reference numerals designate like elements where appropriate and reference numerals with the addition of one-hundred or multiples thereof designate modified elements that are understood to incorporate the same features and benefits of the corresponding elements. In this example, the isolation valve 124 is configured for flow testing. In this regard, in addition to the inlet 32 and the outlet 34, the valve body 30 defines a test port 46 that opens into the flow passage 36 and is fluidly connected with the outlet 34 but not the inlet 32 (at least prior to breach of the rupture diaphragm 38). The test port 46 may be adapted with a desired form of connector for attaching various testing equipment. The outlet 34 contains a filter 48 and a venturi 50. The filter 48 serves to facilitate removal of impurities in a test fluid, and the venturi aids in water hammer reduction.

Figure 5:
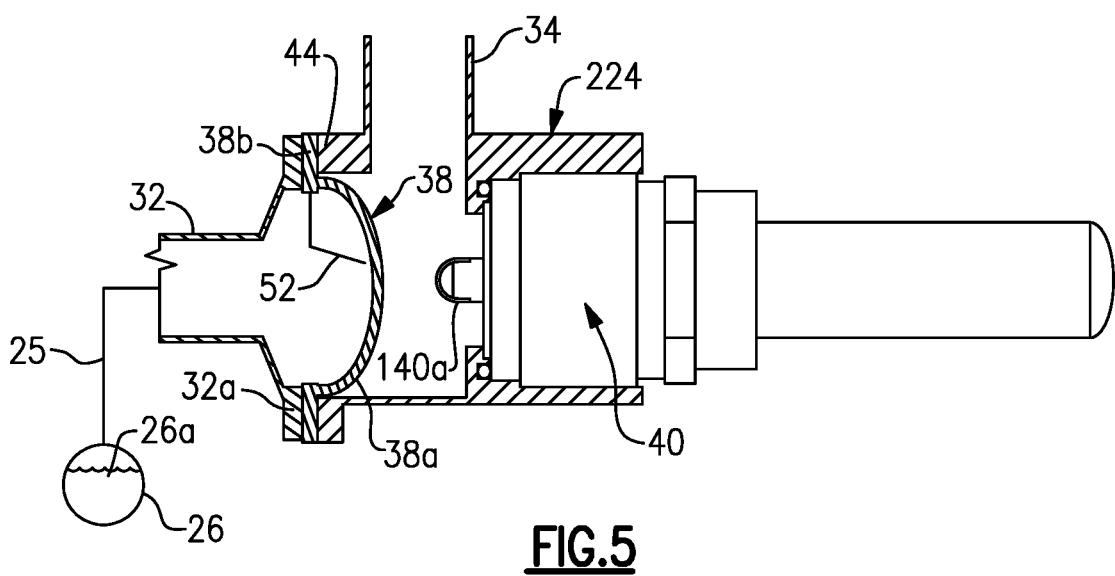
FIG. 5 illustrates another example isolation valve in which there is a knife edge adjacent the diaphragm section.

FIG. 5 illustrates another example isolation valve 224. In this example, the isolation valve 224 includes at least one knife edge 52 adjacent the rupture diaphragm 38. The knife edge 52 is located on an opposite side of the rupture diaphragm 38 from the plunger 140a of the actuator 40. The plunger 140a, when extended, deflects the diaphragm section 38a toward the knife edge 52. Upon impact between the knife edge 52 and the diaphragm section 38a, the knife edge 52 breaches the diaphragm section 38a. This breach may occur by cutting, piercing, tearing, or other manner that is sufficient to rupture the rupture diaphragm 38 such that the inlet 32 and the outlet 34 become fluidly connected, thereby permitting fuel to flow through the isolation valve 224 for propulsion and/or orientation adjustment.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A fuel-isolation system, comprising:
a valve body defining a flow passage extending from an inlet to an outlet, and in addition to the inlet and the outlet, the valve body defining a test port that opens into the flow passage and is fluidly connected with the outlet but not the inlet;
a rupture diaphragm integral to the valve body, the rupture diaphragm in the flow passage and fluidly sealing the inlet from the outlet;
an actuator situated adjacent the rupture diaphragm, the actuator including a plunger that is configured to move and cause breach of the rupture diaphragm and thereby fluidly connect the inlet and the outlet; and
a propellant tank having an outlet attached to or integral to the inlet of the valve body.

2. The fuel-isolation system as recited in claim 1, wherein the actuator is a thermal actuator.

3. The fuel-isolation system as recited in claim 1, wherein the actuator is a wax actuator.

4. The fuel-isolation system as recited in claim 1, wherein the plunger is a piston.

5. The fuel-isolation system as recited in claim 1, wherein the plunger is configured to pierce the rupture diaphragm.

6. The fuel-isolation system as recited in claim 1, wherein the rupture diaphragm has at least one score line.

7. The fuel-isolation system as recited in claim 1, wherein the rupture diaphragm is curved.

8. The fuel-isolation system as recited in claim 1, further comprising a knife edge adjacent the rupture diaphragm and located on an opposite side of the diaphragm from the actuator.

9. The fuel-isolation system as recited in claim 1, wherein the rupture diaphragm is welded to the valve body.

10. The fuel-isolation system as recited in claim 1, wherein the rupture diaphragm is metallic.

11. The fuel-isolation system as recited in claim 1, wherein the outlet contains a filter.

12. The fuel-isolation system as recited in claim 11, wherein the outlet contains a venturi.

13. The fuel-isolation system as recited in claim 1, further comprising a fuel tank connected with the inlet.

14. The fuel-isolation system as recited in claim 13, wherein the propellant tank contains pressurized hydrazine.

15. A vehicle comprising the fuel isolation system as recited in claim 1.

16. A fuel-isolation system, comprising:
- a valve body defining a flow passage extending from an inlet to an outlet;
- a test port that is fluidly connected with the outlet but not the inlet;
- a rupture diaphragm integral to the valve body, the rupture diaphragm in the flow passage and fluidly sealing the inlet from the outlet;
- an actuator situated adjacent the rupture diaphragm, the actuator including a plunger that is configured to move and cause breach of the rupture diaphragm and thereby fluidly connect the inlet and the outlet; and
- a propellant tank having an outlet attached to or integral to the inlet of the valve body.

17. The fuel-isolation system as recited in claim 16, wherein the actuator is a wax actuator.

18. The fuel-isolation system as recited in claim 17, wherein the rupture diaphragm is curved.

\* \* \* \* \*